United States Patent [19]

Funakubo et al.

[11] Patent Number: 5,416,375
[45] Date of Patent: May 16, 1995

[54] ULTRASONIC MOTOR

[75] Inventors: Tomoki Funakubo; Takanao Fujimura, both of Tokyo; Hiroyuki Imabayashi, Sagamihara; Takashi Ouchi, Tokyo; Yoshihisa Taniguchi, Tokyo; Toshiharu Tsubata, Tokyo, all of Japan

[73] Assignee: Olympus Optical Co., Ltd., Tokyo, Japan

[21] Appl. No.: 304,083

[22] Filed: Sep. 9, 1994

Related U.S. Application Data

[63] Continuation of Ser. No. 76,245, Jun. 11, 1993, abandoned.

[30] Foreign Application Priority Data

Jun. 15, 1992 [JP] Japan ................... 4-155214
Sep. 24, 1992 [JP] Japan ................... 4-321096

[51] Int. Cl.⁶ ............................................ H01L 41/08
[52] U.S. Cl. ................................. 310/323; 310/317; 310/328
[58] Field of Search ............... 310/321, 323, 328, 316, 310/317, 319; 318/116

[56] References Cited

U.S. PATENT DOCUMENTS

| | | | |
|---|---|---|---|
| 3,902,084 | 8/1975 | May, Jr. ........................... | 310/328 X |
| 5,001,404 | 3/1991 | Kataoka ........................... | 310/316 X |
| 5,062,622 | 11/1991 | Kataoka ........................... | 310/323 X |
| 5,073,739 | 12/1991 | Iijima et al. ...................... | 310/323 |
| 5,101,132 | 3/1992 | Yamaguchi ...................... | 310/323 |
| 5,105,117 | 4/1992 | Yamaguchi ...................... | 310/323 |
| 5,136,200 | 8/1992 | Takizawa et al. ................. | 310/323 |
| 5,140,215 | 8/1992 | Yamaguchi ...................... | 310/323 |
| 5,198,714 | 3/1993 | Salomon et al. ................... | 310/323 |
| 5,200,665 | 4/1993 | Iijima et al. ...................... | 310/323 |
| 5,233,258 | 8/1993 | Myoga et al. ..................... | 310/323 |

FOREIGN PATENT DOCUMENTS

| | | |
|---|---|---|
| 63-277477 | 11/1988 | Japan . |
| 1-126176 | 5/1989 | Japan . |
| 0126176 | 5/1989 | Japan ................... 310/323 |
| 0126177 | 5/1989 | Japan ................... 310/323 |
| 0126178 | 5/1989 | Japan ................... 310/323 |
| 0026282 | 1/1990 | Japan ................... 310/323 |
| 0055585 | 2/1990 | Japan ................... 310/368 |
| 0188169 | 7/1990 | Japan ................... 310/323 |

*Primary Examiner*—Mark O. Budd
*Attorney, Agent, or Firm*—Louis Weinstein

[57] ABSTRACT

An ultrasonic motor comprising an elastic body, at least two laminated piezoelectric bodies clamped by a portion of the elastic body, an ultrasonic oscillator for exciting simultaneously a plurality of shrunk and retreated oscillation modes on the elastic body, to generate ultrasonic elliptic oscillation, and an element to be driven urged against a portion of the ultrasonic oscillator and movable with respect to the ultrasonic oscillator.

26 Claims, 11 Drawing Sheets

FIG.6(a)  FIG.6(b)  FIG.6(c)
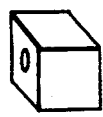  
FIG.7
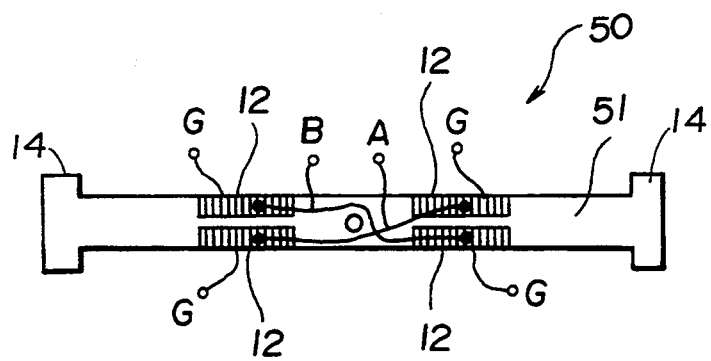

ULTRASONIC MOTOR

This is a continuation of application Ser. No. 08/076,245, filed Jun. 11, 1993, now abandoned.

BACKGROUND OF THE INVENTION

1. Field of the Invention

The present invention relates to ultrasonic motors and, more particularly, to an ultrasonic motor which uses a laminated piezoelectric body as a drive source.

2. Related Art and Prior Art Statement

In recent years, attention is paid to the ultrasonic motor as a new motor substituted for an electromagnetic motor. The ultrasonic motor has the following advantages as compared with a conventional electromagnetic motor:

(1) Low-speed and a high-thrust force are produced without gears;
(2) A retaining force is large or high;
(3) Stroke is long, and resolution is high;
(4) Silence is rich; and
(5) Magnetic noises are not generated, and affection or influence of the noises does not also suffer.

As a conventional ultrasonic linear motor, there is one disclosed in Literature: "Paper Feed Device Due To Planar-Plate Motor Utilizing Longitudinal-Bending Multiple Mode Vibrator or Oscillator" (Yoshiro TOMIKAWA et al, National Conference Of Electronic Information Communication Society, Spring 1988, P146). As shown in FIG. 20 of the attached drawings, the oscillator in the ultrasonic linear motor is arranged such that three (3) piezoelectric ceramics 202, 203 and 204 are bonded or adhered to a resilient or elastic body 201 which is formed by a stainless steel sheet or plate. The oscillator is held or retained by silicon rubber 210. The piezoelectric ceramics includes one for an L-mode (longitudinal oscillation mode) at a center and two for a B-mode (bending oscillation mode) at both ends which are bonded to each other. As a configuration in which resonant frequencies of both modes are coincident with each other, alternating voltages corresponding to the resonant frequency are applied to the piezoelectric ceramics 203 of the L-mode and the ceramics 202 and 204 of the B-mode. A phase difference between these alternating voltages is adequately provided whereby it is possible to generate ultrasonic elliptic oscillation at a portion indicated by oblique lines in FIG. 18 and FIG. 19. In order to drive paper (the body to be driven) 205, for example, if the body to be driven is arranged through a pair of pressure rolls 206 serving as an urging mechanism, by generating ultrasonic elliptic oscillation, it is possible to linearly drive the paper (the body to be driven) 205. A portion of the piezoelectric element is cut off or separated and is brought to a feedback terminal, and the feedback terminal is utilized for self-excited oscillation. Further, signals from two locations on the piezoelectric element are connected in parallel to each other so as to be brought to feedback signals, to detect oscillation of only a third overtone, and so as to be brought to a feedback terminal so that the feedback terminal is utilized for self-excited oscillation.

Moreover, as a conventional ultrasonic linear motor, there is one disclosed in Japanese Patent Laid-Open No. SHO 63-277477 (277477/1988). Hereinafter, the ultrasonic linear motor will be described with reference to the publication. In FIG. 1 of the publication, a piezoelectric element 2a (or 2b) is provided on a substrate 1 to excite quaternary bending oscillation, and a piezoelectric element 2c is used to excite primary longitudinal oscillation. Resonant frequencies of these respective oscillations are coincident with each other. The oscillator is arranged at positions of nodes of the bending oscillation, As shown in FIG. 4 of the publication, an urging spring is used to urge a slider. If alternating voltage coincident with the resonant frequency is applied to the piezoelectric element 2a and the piezoelectric element 2c, the slider moves in a right-hand direction in the figure. When alternating voltage coincident with the resonant frequency is applied to the piezoelectric element 2b and the piezoelectric element 2c, the slider moves in a left-hand direction in the figure. Furthermore, a feedback terminal is taken out from a portion of the piezoelectric element to form a self-excited circuit.

Further, as a conventional ultrasonic linear motor, there is one disclosed in Japanese Patent Laid-Open No. HEI 1-126176 (126176/1989). The ultrasonic linear motor will hereunder be described with reference to a publication. In FIG. 1 of the publication, a piezoelectric body is arranged between projections which are provided in a longitudinal direction of an oscillation plate, to excite a primary longitudinal oscillation mode in the longitudinal direction by the piezoelectric element. The piezoelectric body is arranged between the projections which are provided laterally of the oscillation plate, to excite a primary width bending oscillation mode in a lateral direction by the piezoelectric element. A body to be driven (paper) urged to a predetermined position on the oscillator is fed by a roller.

However, the conventional ultrasonic linear motors have the following problems. First, problems of the ultrasonic motor disclosed in the literature: "Paper Feed Device Due To Planar-Plate Motor Utilizing Longitudinal-Bending Multiple Mode Vibrator" (Yoshiro TOMIKAWA et al, National Conference Of Electronic Information Communication Society, Spring 1988, P146) will be described. Three piezoelectric ceramics (thickness: 0.5 mm) are bonded to an elastic body. Piezoelectric effects of the piezoelectric ceramics are utilized so that oscillation is excited. Generally, an electric-mechanical bonding coefficient in the piezoelectric lateral effects of the piezoelectric ceramics is of the order of substantially 30%~40%, and is considerably low as compared with the fact that the electric-mechanical bonding coefficient in the piezoelectric longitudinal effects is substantially 60%~70%. If the electric-mechanical bonding coefficient is low, input voltage muse be raised in order to generate oscillation of the same level. Since the piezoelectric element is also a plate or sheet material whose thickness is 0.5 mm, if the input voltage is not also raised, it is impossible to take out a large or high output. In practice, there occurs a problem that relatively high voltage of the order of several tens of +V ms to 100 V ms is required. Moreover, there also occurs a problem that, if an oscillation level is raised, adhesion between the elastic body and the piezoelectric element is peeled off.

Next, a problem of an arrangement disclosed in Japanese Patent Laid-Open No. SHO 63-277477 (277477/1988) as a conventional ultrasonic linear motor will be described. Three piezoelectric ceramics (thickness: 0.6 mm) are bonded to a resilient or elastic body. Piezoelectric lateral effects of the piezoelectric ceramics are utilized so that oscillation is excited, similar to the aforesaid example. For this reason, an electric-mechanical bonding coefficient is reduced so that input voltage must be raised. There is a problem that, since a piezoelectric element is also a plate or sheet material whose thickness is 0.6 mm, a large or high output cannot be taken out if input voltage is also raised. Moreover, there occurs a problem similar to the aforesaid example that, if an oscillation level is raised, bonding or adhesion between the elastic body and the piezoelectric element is peeled off. Furthermore, the present example has the following problem. That is, in order to change over a drive direction of a body to be driven, voltage applied to the piezoelectric element is changed over. Accordingly, since one of the three piezoelectric elements is not used, it is impossible to sufficiently produce a power. Regarding a method in which a signal from the piezoelectric element for detection of oscillation is used to perform feedback, feedback is merely performed by a signal in which the longitudinal oscillation and the bending oscillation are superimposed upon each other or a signal of a third overtone (bending oscillation), and oscillation that is longitudinal oscillation is not considered. Further, there is no clear or definite description in the specification, regarding the bonding position of the piezoelectric element.

Problems of an arrangement disclosed in Japanese Patent Laid-Open No. HEI 1-126176 (126176/1989) as the conventional linear motor will next be described. A problem that bonding is peeled off because the piezoelectric element is provided between the projections on the elastic body is solved. However, Judging from the before and behind relation although there is no clear or definite description in the specification, it has been considered that the piezoelectric lateral effects of the piezoelectric ceramics are utilized so that oscillation is excited, similar to the aforementioned example and the last example. For this reason, there is a problem that the electric-mechanical bonding coefficient is reduced so that the input voltage must be raised. Furthermore, there are problems that, since, in the present example, the primary longitudinal oscillation mode in the longitudinal direction and the primary lateral bending oscillation mode in the lateral direction are utilized, piezoelectric elements different in size from each other must be prepared as the piezoelectric element as shown in FIG. 1 of the publication, and that shape or configuration as the ultrasonic oscillator becomes unbalanced so that a mode superior in symmetrical property or symmetrizing cannot be excited.

OBJECTS AND SUMMARY OF THE INVENTION

It is a first object of the invention to provide an ultrasonic motor which is high in electric-mechanical energy conversion efficiency and which is capable of being driven at low voltage.

It is a second object of the invention to provide an ultrasonic motor which is high in electric-mechanical energy conversion and in which there is no peeling-off of adhesion.

It is a third object of the invention to provide an ultrasonic motor which is small in size, which is high in output, which is high in electric-mechanical energy conversion efficiency, which is capable of driving a body to be driven by at least a pair of laminated piezoelectric bodies and in which there can be produced oscillation superior in symmetry.

Briefly, according to the invention, there can be provided an ultra-sonic motor comprising an elastic body, at least two laminated piezoelectric bodies clamped by a portion of the elastic body, an ultrasonic oscillator for exciting simultaneously a plurality of shrunk and retreated oscillation modes on the elastic body to generate ultrasonic elliptic oscillation, and an element to be driven being urged against a portion of the ultrasonic oscillator and movable with respect to the ultrasonic oscillator.

These, as well as other, objects and advantages of the present invention will become further apparent from the following detailed explanation.

BRIEF DESCRIPTION OF THE DRAWINGS

FIGS. 6(a), 6(b) and 6(c) are perspective views showing an another example of a replaceable frictional portion in the modification of the ultrasonic motor according to the first embodiment illustrated in FIG. 5;

FIG. 7 is a side elevational view showing an ultrasonic oscillator which is applied to another modification off the ultrasonic motor according to the aforesaid first embodiment;

DETAILED DESCRIPTION OF THE PREFERRED EMBODIMENTS

Various embodiments of the invention will hereunder be described with reference to the accompanying drawings.

Figure 1:
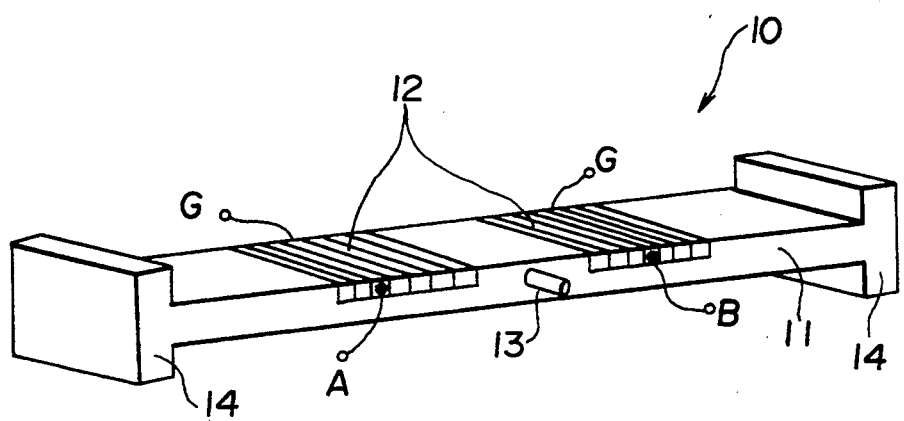
FIG. 1 is a perspective view showing an ultrasonic oscillator which is applied to an ultrasonic motor according to a first embodiment of the invention.

FIG. 1 is a perspective view showing an ultrasonic vibrator or oscillator 10 which is applied to an ultrasonic motor according to a first embodiment of the invention.

As shown in FIG. 1, the ultrasonic oscillator 10 is provided with a resilient or elastic body 11 which is formed such that hard alumite treatment is applied to an aluminum material. A pair of columnar projections 13 are provided in extension respectively on opposing side surfaces of a central portion of the elastic body 11 which serves as a loop of oscillation. Further, a pair of frictional sections 14 which project In both upper and lower directions are formed respectively at both ends of the elastic body 11. Moreover, rectangular grooves are formed in a portion of the elastic body 11 which corresponds to a loop of bending secondary oscillation, and a pair of laminated piezoelectric elements 12 substantially the same in size as the configuration of the grooves are so arranged as to be fitted respectively into the grooves.

The laminated piezoelectric elements 12 are arranged such that piezoelectric elements each having a thickness thereof of 0.1 mm, for example, are laminated to each other such that orientations of polarization are altered, and are electrically connected to each other for in surfaces opposite to each other every single layer. Furthermore, a pair of electric terminals G, and a pair of electric terminals A and B are led respectively through the laminated piezoelectric elements 12 as shown in FIG. 1. In this connection, when the laminated piezoelectric elements 12 are arranged in the grooves, since the laminated piezoelectric elements 12 are arranged under a condition that the grooves in the elastic body 11 are mechanically expanded or enlarged, the laminated piezoelectric elements 12 are finally arranged under a condition that pre-load is applied to the laminated piezoelectric elements 12.

Figure 2:
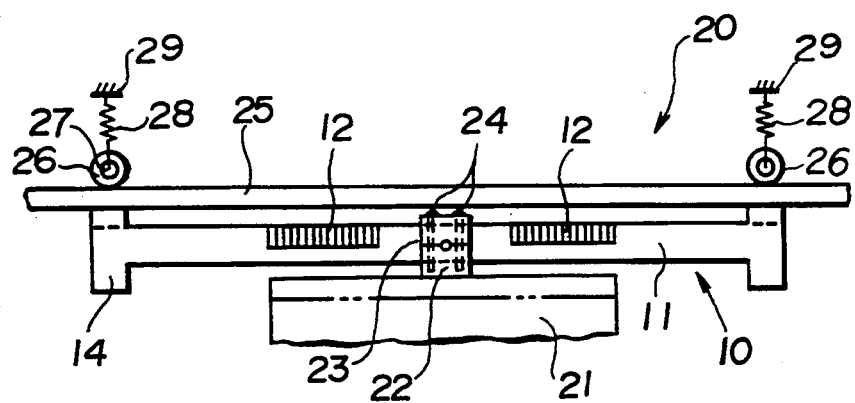
FIG. 2 is a side elevational view showing the ultrasonic motor according to the first embodiment of the invention, to which the ultrasonic oscillator illustrated in FIG. 1 is applied.

FIG. 2 is a side elevational view showing an ultrasonic motor 20 according to the first embodiment of the invention, to which the ultrasonic oscillator 10 is applied.

As shown in FIG. 2, a pair of support portions 22 are provided at opposite sides of a central portion of an upper surface of a base 21. A pair of semicircular recesses corresponding to a diameter of each of the projections 13 are formed respectively at centers of upper surfaces of the support portions 22, so that the recesses and a pair of retaining portions 23 having recesses the same in type and the same in size as the aforesaid recesses cooperate with each other to form circular bores. The ultrasonic oscillator 10 is such that the projections 13 are inserted respectively into the circular bores, and are fixedly retained by the use of screws 24.

On the other hand, a slider 25 in the form of a plate formed by a stainless steel material (hardening- or quenching-treated article), for example, rests on an upper surface of the pair of frictional sections 14 in the ultrasonic oscillator 10, and the slider 25 is clamped and is urged against or toward the frictional sections 14 with a predetermined urging force by a pair of pressure-contact rollers 26 which are arranged at a position opposed against the frictional sections 14. The pressure-contact rollers 26 are held or retained at locations respectively between the frictional sections 14 and shafts of the respective pressure-contact rollers 26 through bearings 27 so that the shafts are urged respectively by spring elements 28 having ends thereof which are fixed to fixing portions 29.

Next, operation of the ultrasonic oscillator 10 in the first embodiment will be described.

Alternating voltage (frequency: fr) of the order of ±10 V P-P having a predetermined phase difference is applied to the electric terminal A and the electric terminal B (refer to FIG. 1). Here, frequency of the alternating voltage is substantially coincident with frequencies of the primary natural longitudinal oscillation and the secondary natural bending oscillation of the ultrasonic oscillator 10.

Figure 3A:
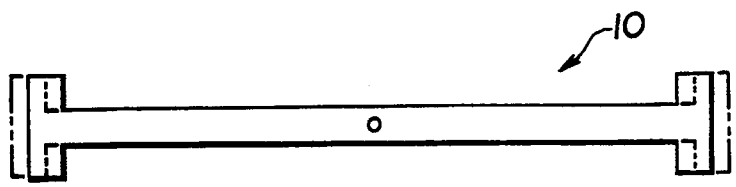
FIG. 3(a) is a diagram showing a primary natural longitudinal oscillation mode of the ultrasonic oscillator in the above-described first embodiment.
Figure 3B:
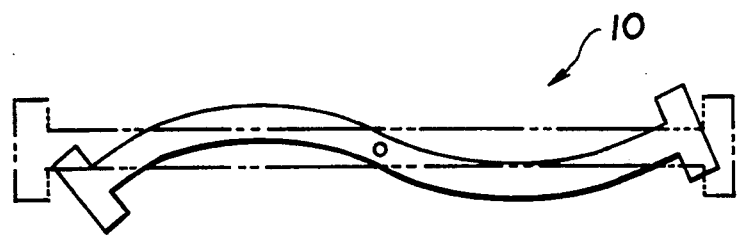
FIG. 3(b) is a diagram showing a secondary natural bending oscillation mode of the ultrasonic oscillator.

FIG. 3(a) is a diagram showing a primary natural longitudinal oscillation mode of the ultrasonic oscillator 10, while FIG. 3(b) is a diagram showing a secondary natural bending oscillation mode of the oscillator 10. The ultrasonic oscillator 10 is of a size in which the primary natural longitudinal oscillation and the secondary natural bending oscillation are substantially coincident in natural frequency with each other.

When alternating voltages which are the same in phase are respectively applied to the electric terminal A and the electric terminal B, the ultrasonic oscillator 10 performs primary longitudinal oscillation as shown in FIG. 3(a). Further, alternating voltages different from each other in phase through 180° are applied to the electric terminal A and the electric terminal B, the ultrasonic oscillator 10 generates secondary bending oscillation as shown in FIG. 3(b). Accordingly, it is possible to generate ultrasonic elliptic oscillation at both ends of the ultrasonic oscillator 10 by the face that the phase difference between the electric terminal A and the electric terminal B is set in the vicinity of ±90°.

The ultrasonic motor 20 according to the first embodiment of the invention, to which the ultrasonic oscillator 10 is applied, generates ultrasonic elliptic oscillation at the both ends of the ultrasonic oscillator 10, that is, on the frictional sections 14, whereby the slider 25 urged against the frictional sections 14 is linearly driven in a predetermined direction. Moreover, in order to change the driving direction of the slider 25, the phases of the electric terminal A and the electric terminal B should be changed from +90° to −90° or from −90° to +90°.

According to the first embodiment of the invention, it is possible to provide an ultrasonic motor which is compact, which is in the form of a planar plate, which is capable of being driven at low voltage and which is high in electric-mechanical conversion efficiency. Furthermore, since the phase difference between the applied voltages should be set to ±90°, it is possible to provide an ultrasonic motor which is easy to control.

Next, a modification of the aforesaid first embodiment will be described.

Figure 4:
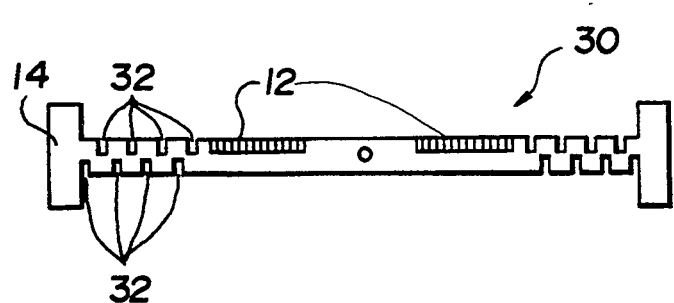
FIG. 4 is a side elevational view showing an ultrasonic oscillator which is applied to a modification of the ultrasonic motor according to the aforesaid first embodiment.

FIG. 4 is a side elevational view showing an ultrasonic oscillator 30 in an ultrasonic motor according to the modification.

A difference between the modification and the aforementioned first embodiment is that a plurality of grooves 32 are formed, as shown in FIG. 4, in upper and lower surfaces of an elastic body 31 of the ultrasonic oscillator 30, that is, respectively between the piezoelectric elements 12 and the frictional sections 14. By doing so, it is possible to reduce the effective Young's modulus at both ends, and to enlarge oscillation amplitude at both ends.

Figure 5:
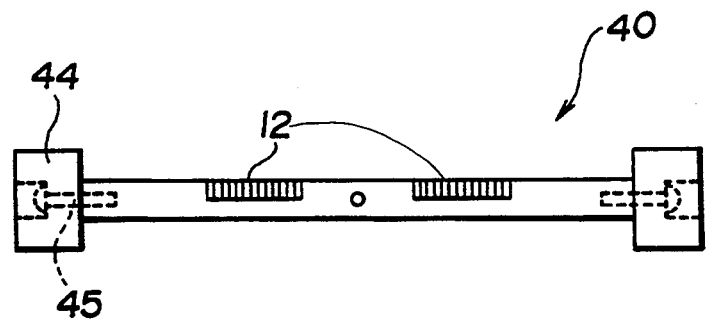
FIG. 5 is a side elevational view showing an ultrasonic oscillator which is applied to another modification of the ultrasonic motor according to the aforementioned first embodiment.

FIG. 5 is a side elevational view showing an ultrasonic oscillator 40 according to a further modification of the aforesaid first embodiment.

A difference between the modification and the aforementioned first embodiment is that frictional sections 44 at both ends of the ultrasonic oscillator 40 are so arranged as to be detachable and replaceable respectively by a pair of screws 45 as shown in FIG. 5. By doing so, it is possible to replace the frictional sections 44 in a case where the frictional sections 44 are degraded and are worn or abraded by contact with the slider 25 (refer to FIG. 2). Further, the frictional sections 44 are optionally changeable in shape or configuration as illustrated in FIG. 6(a), FIG. 6(b) and FIG. 6(c). Moreover, it is also possible to perform regulation of resonant frequency or regulation of the amplitude at both ends, by the fact that masses of the respective frictional sections 44 are changed.

FIG. 7 is a side elevational view showing an ultrasonic oscillator 50 according to a still another modification of the aforesaid first embodiment.

A difference between the modification and the aforementioned first embodiment is that four (4) laminated piezoelectric elements 12 are provided at upper and lower surfaces of an elastic body 51, as shown in FIG. 7. By doing so, there can be produced an advantage that an attempt can be made to improve motor output.

Figure 8:
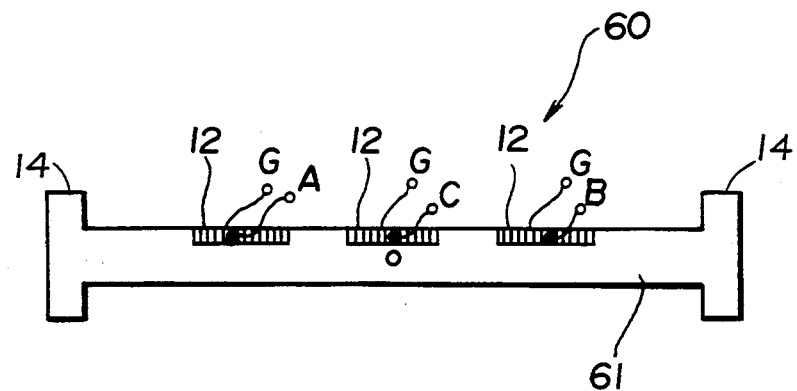
FIG. 8 is a side elevational view showing an ultrasonic oscillator which is applied to an ultrasonic motor according to a second embodiment of the invention.

Next, an ultrasonic motor according to a second embodiment of the invention will be described, FIG. 8 is a side elevational view showing an ultrasonic oscillator 60 which is applied to the ultrasonic motor according to the second embodiment of the invention.

A difference between the second embodiment and the aforesaid first embodiment is that laminated piezoelectric elements 12 are also provided at a central portion of an elastic body 61.

In FIG. 8, alternating voltages having a frequency fr which are different from each other in phase through 180° are applied to an electric terminal A and an electric terminal B, to generate secondary bending oscillation. Moreover, alternating voltage having frequency fr is applied to an electric terminal C to generate primary longitudinal oscillation. A phase difference of the alternating voltages applied to the electric terminal A (B) and the electric terminal C is controlled whereby it is possible to generate ultrasonic elliptic oscillation at both ends of the ultrasonic oscillator 60. In this connection, operation as an ultrasonic motor is similar to that of the aforementioned first embodiment and, accordingly, a description thereof will be omitted here.

According to the ultrasonic motor of the second embodiment, magnitudes or dimensions of the applied voltages on the electric terminal A (B) and the electric terminal C are adjusted or regulated whereby it is possible to change dimensions of amplitude of the bending oscillation and the longitudinal oscillation. By doing so, it is possible to optionally control elliptical shape or configuration of the ultrasonic elliptical oscillation. Thus, it is made possible to set the elliptic configuration in which operation of the ultrasonic motor is most stabilized.

According to these embodiments, piezoelectric longitudinal effects of the piezoelectric element are used as a drive source, whereby it is possible to provide the ultrasonic motor which is high in electric-mechanical conversion efficiency and which can be driven at low voltage.

A third embodiment of the invention will next be described.

Figure 9:
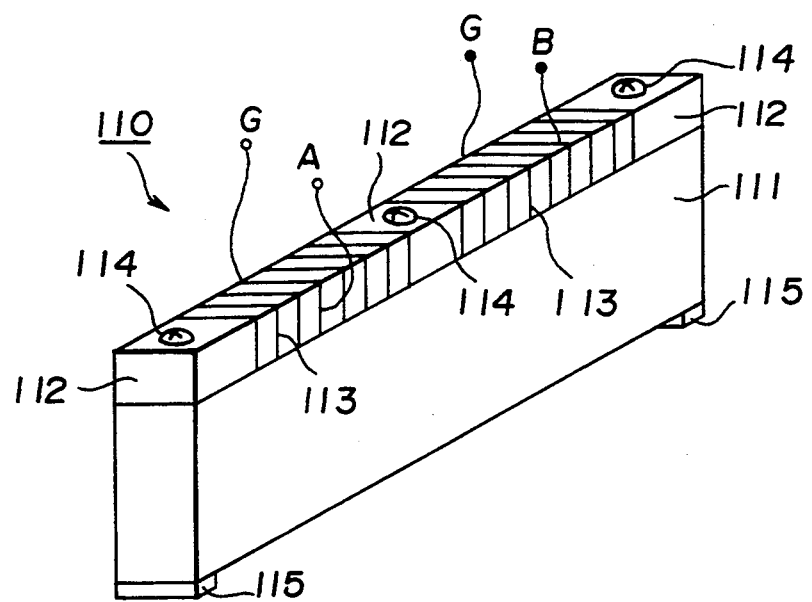
FIG. 9 is a perspective view showing an ultrasonic oscillator which is applied to an ultrasonic motor according to a third embodiment of the invention.
Figure 10:
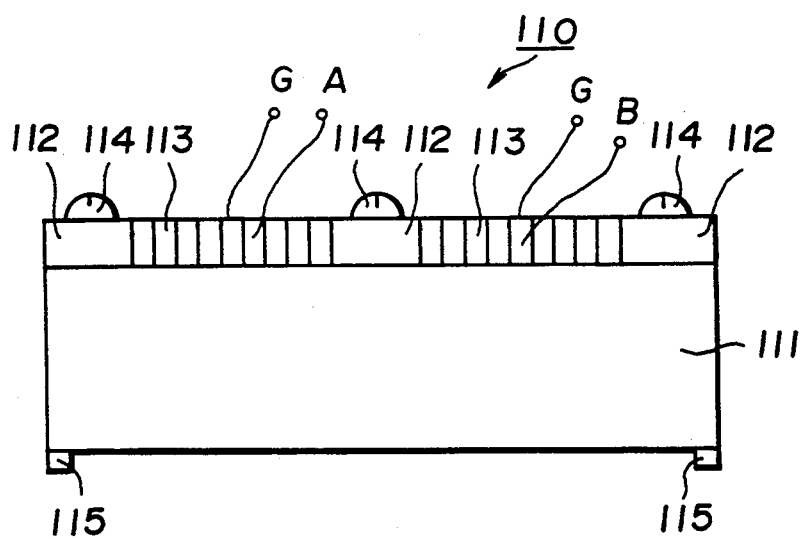
FIG. 10 is a front elevational view showing the ultrasonic oscillator shown in FIG. 9.

FIG. 9 is a perspective view showing an ultrasonic oscillator applied to an ultrasonic motor according to a third embodiment of the invention, while FIG. 10 is a front elevational view.

As shown In FIGS. 9 and 10, an ultrasonic oscillator 110 is arranged such that three holding or retaining elastic bodies 112 are fixedly mounted on an upper surface of a basic elastic body 111, and laminated piezoelectric elements 113 are clamped by the retaining elastic bodies 112 and are fixed respectively to locations between the retaining elastic bodies 112.

The basic elastic body 111 is arranged such that a brass material is processed into rectangular parallelepiped configuration, and the retaining elastic bodies 112 are fixedly mounted respectively on three locations including opposite ends of an upper surface and a central portion (portions corresponding respectively to nodes of secondary bending oscillation) by epoxy adhesives and are fastened respectively by screws 114. The laminated piezoelectric elements 113 are abutted against and are retained respectively at locations between the retaining elastic bodies 112. That is, the laminated piezoelectric elements 113 are bonded to and are fixedly mounted respectively on the retaining elastic bodies 112 so as not to be in contact with the basic elastic body 111. Furthermore, resin coating is applied to side surfaces of the laminated piezoelectric elements 113. Here, electrodes to the laminated piezoelectric element 113 shown on the left in FIG. 10 are A and G and are called "A-phase". Similarly, electrodes to the laminated piezoelectric element 113 on the right are called B and G and are called "B-phase".

A pair of sliding elements 115 are adhered respectively to both ends of a bottom surface of the basic elastic body 111. Each of the sliding elements 115 is arranged such that carbon fiber (20 weight %) and mica (30 weight %) are mixed as filler with polymide, and thickness is about 0.1 mm.

In connection with the above, if preface or introductory dimensions of the aforesaid ultrasonic oscillator are mentioned as a reference, size of the basic elastic body 111 is such that width is 30 mm, height is 8 mm and depth is 4 mm. The size of each of the retaining elastic bodies 112 is such that the width is 4 mm, height is 3 mm and depth is 4 mm. In the present embodiment, each of the laminated piezoelectric elements 113 uses NLA−2×3×9 manufactured by Tokin (Kabushiki Kaisha), and the size thereof is 2 mm×3.1 mm×9 mm.

Figure 11A:
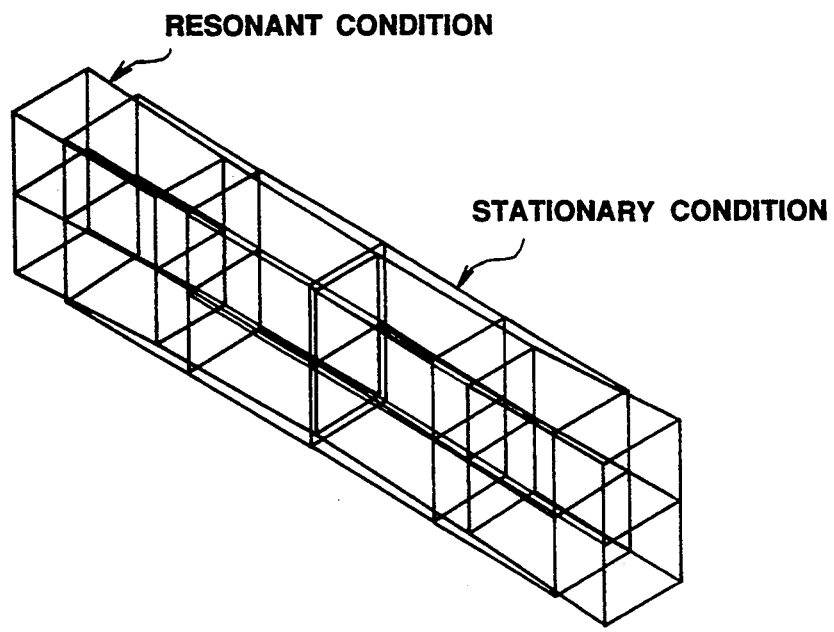
FIGS. 11(a) and 11(b) are views for explanation of function of the ultrasonic oscillator illustrated in FIG. 9.
Figure 11B:
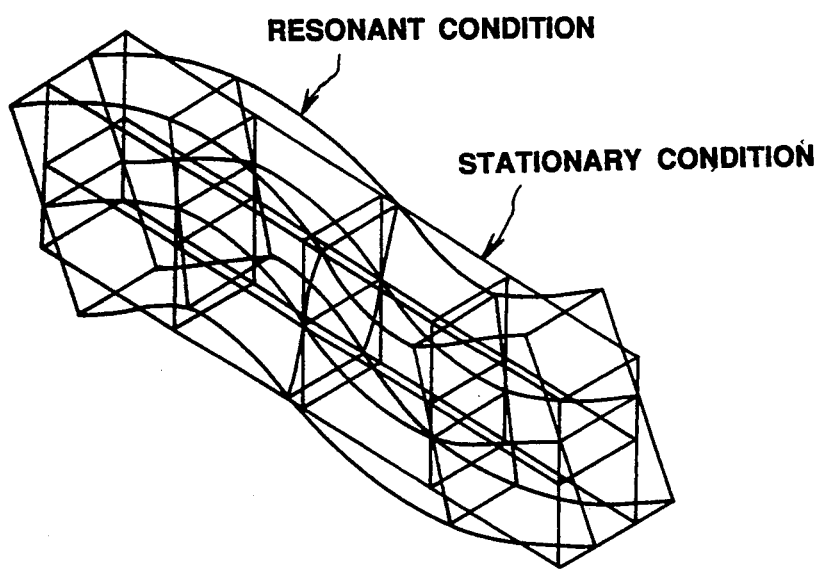

Operation of the above-described ultrasonic oscillator will next be described. According to a computer simulation, the ultrasonic oscillator dimensioned as described above can be excited such that primary resonant longitudinal oscillation as shown in FIG. 11(a) and secondary resonant bending oscillation as shown in FIG. 11(b) are substantially the same in frequency as each other. The frequency thereof is 53.5 kHz. In view of this, direct current voltage of 30 V is applied to an A-phase and a B-phase to apply compressive pre-toad to the laminated piezoelectric elements 113, and alternating voltage having a frequency of 53.5 kHz and amplitude of 10 $V_{p-p}$ is applied to the A-phase and the B-phase. Here, if phases of the A-phase and the B-phase are the same in phase as each other, primary resonant longitudinal oscillation as shown in FIG. 11(a) is excited.

Next, when the phases of the A-phase and the B-phase are reversed in phase, secondary resonant bending oscillation as shown in FIG. 11(b) is excited. Next, when the phase between the A-phase and the B-phase is shifted through 90 degrees, ultrasonic elliptic oscillation can be excited at a location in the vicinity of each of the sliding elements 115.

Figure 12:
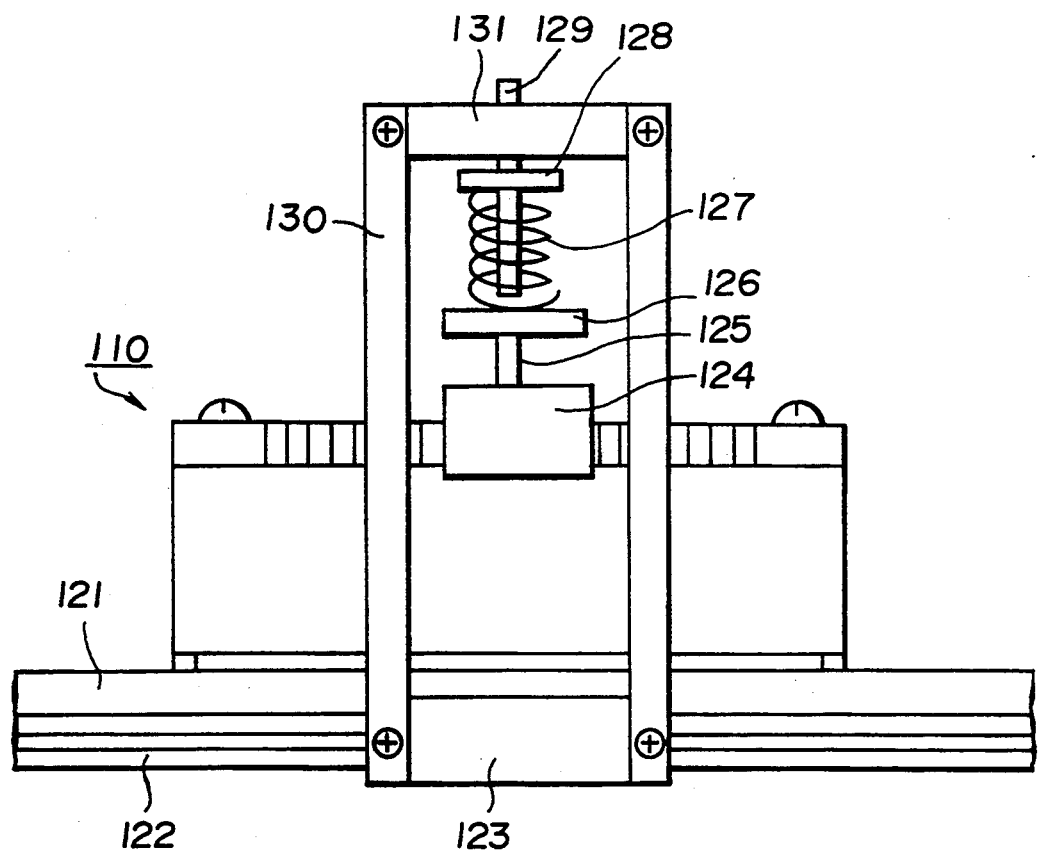
FIG. 12 is a front elevational view showing an ultrasonic motor according to a third embodiment of the invention.

Next, an ultrasonic motor which uses the above-described ultrasonic oscillator will be described. FIG. 12 is a front elevational view of the ultrasonic motor. As shown in FIG. 12, in the ultrasonic motor, the ultrasonic oscillator 110 is selectively self-propelled to the left and to the right on a rail 121. In order to guide the ultrasonic oscillator 110, a linear guide fixing portion 122 is provided on a rear surface of the rail 121, while a pair of linear guide moving portions 123 are provided on a lower end of a support mechanism for the ultrasonic oscillator 110.

The ultrasonic oscillator 110 is retained by a pair of oscillator retaining elements 124 made of an aluminum material through silicon rubbers (not shown) whose thickness is 1 mm. Each of the oscillator retaining elements 124 is in the form of reversed C-shape, and a pair of connecting rods 125 are connected respectively to the oscillator retaining element 124. A pair of spring retainers 126 are formed respectively at upper ends of the connecting rods 125. On the other hand, the rail 121 is made of a stainless steel material in which a surface is quenched and hardened and is smoothly polished. The linear guide fixing portion 122 is integrally fixed to a rear surface of the rail 121. A frame 130 is fixedly mounted on the linear guide moving portions 123, and is integral with an upper frame 131. An opening in a central portion of the upper frame 131 is threaded, and a bolt 129 threadedly engages the threaded opening in the central portion. A spring retainer 128 is mounted on the bolt 129 to adjust the length of a spring 127 so that contact pressure between the ultrasonic oscillator 110 and the rail 121 can be adjusted or regulated.

Next, operation of the ultrasonic motor will be described. As described previously, it is assumed that alternating voltage is applied to an A-phase and a B-phase of the ultrasonic oscillator 110, and a phase difference is 90 degrees (or −90 degrees). Then, ultrasonic elliptic oscillation is excited on the sliding surface of the ultrasonic oscillator 110 so that the ultrasonic oscillator 110 is moved in a right-hand direction (or a left-hand direction) with respect to the rail. Motor characteristics of the present embodiment are such that no-load speed is 150 mm/sec, and a motive thrust force is 2N. This performance is maintained also after 100,000 reciprocal operations.

In connection with the above, the present embodiment may be modified and may be carried out as follows.

(1) In the above-described embodiment, direct-current voltage is superimposed in order to apply pre-load to laminated piezoelectric elements. However, the retaining elastic body is fixed while mechanical pressure is applied from both side surfaces of the retaining elastic body upon assembling.

(2) Similarly, in order to provide pre-loading, the laminated piezoelectric elements are assembled under a depolarization condition prior to assembling, and a voltage of DC 100 V is substantially applied to polarize the laminated piezoelectric elements. At this time, since the pre-load is applied to the laminated piezoelectric elements, it is not required to apply direct-current voltage upon driving.

(3) Further, in a case where the laminated piezoelectric elements are driven at small oscillation amplitude, since a tension force applied to the laminated piezoelectric elements is small, the pre-load need not be applied.

As described above, according to the ultrasonic motor of the present embodiment, since the piezoelectric longitudinal effects are utilized, the electric-mechanical conversion efficiency is considerably improved. Moreover, since the ultrasonic oscillator is operated while the pre-load is applied to the laminated piezoelectric elements, durability of the ultrasonic oscillator is also improved.

A fourth embodiment of the invention will next be described.

Figure 13:
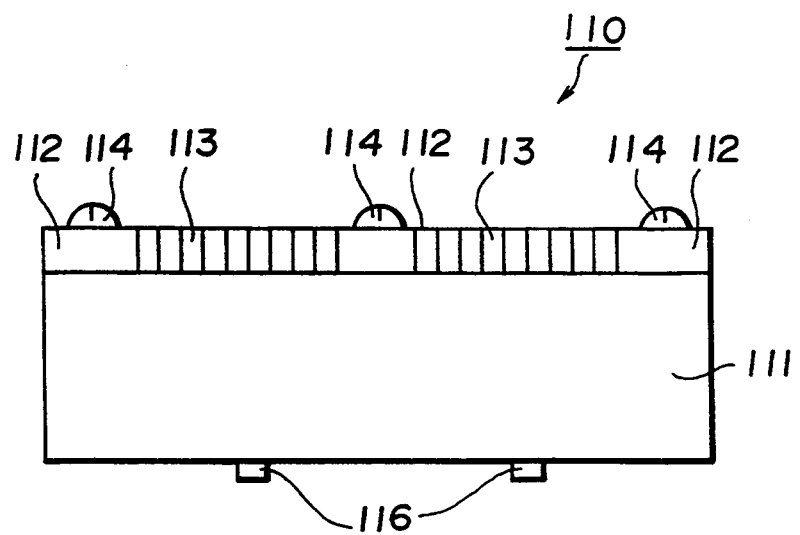
FIG. 13 is a front elevational view showing an ultrasonic oscillator which is applied to an ultrasonic motor according to a fourth embodiment of the invention.
Figure 14A:
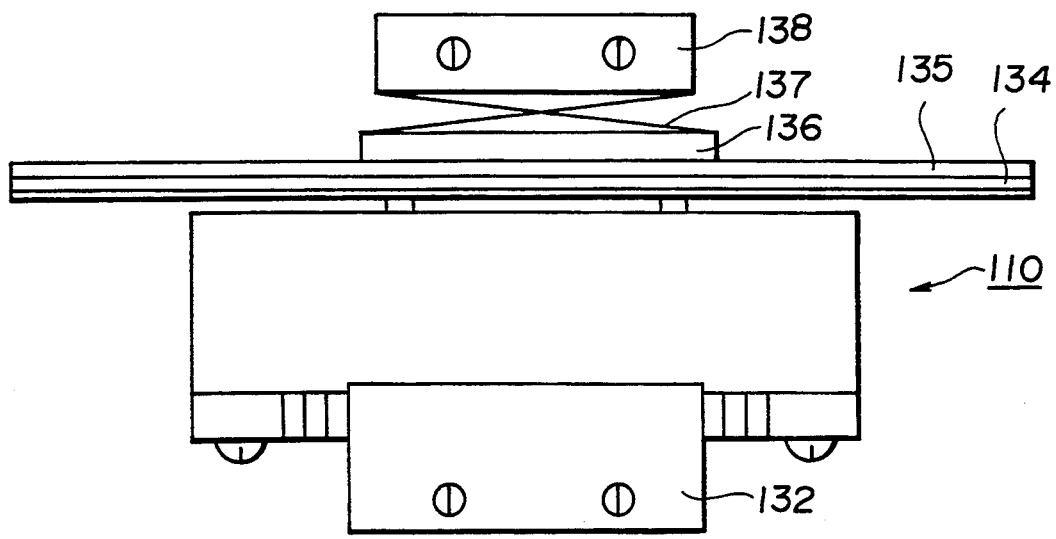
FIG. 14(a) is a front elevational view showing an ultrasonic motor according to the fourth embodiment of the invention.

FIG. 13 is a front elevational view showing an ultrasonic oscillator which is applied to an ultrasonic motor according to the fourth embodiment of the invention, while FIG. 14(a) is a front elevational view showing the ultrasonic motor.

Differences between the ultrasonic oscillator illustrated in FIG. 13 and the aforesaid third embodiment are that a pair of sliding elements 116 are mounted on an another loop of resonant bending oscillation, and that a material is amorphous carbon. Furthermore, in the ultrasonic motor illustrated in FIG. 14(a), an ultrasonic oscillator 110 is fixed, while a rod-like body to be driven 134 is selectively driven to the right and left.

Figure 14B:
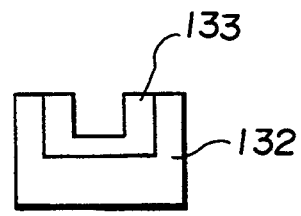
FIG. 14(b) is an end view of a fixing element shown in FIG. 14(a)
Figure 14C:
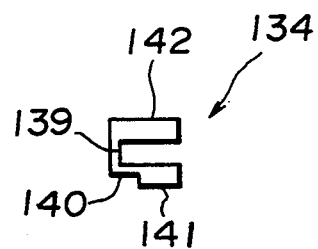
FIG. 14(c) is an end view of a driven body shown in FIG. 14(a)

The ultrasonic oscillator 110 is fixedly mounted on a base (not shown) by a fixing element 132. As shown in a side elevational view of FIG. 14(b), the fixing element 132 is in the form of reversed C-shape in cross-section, and urethane rubber 133 for vibration proofing is adhered to an inner surface of the fixing element 132 which holds or retains the ultrasonic oscillator. Next, the body to be driven 134 has configuration thereof illustrated in cross-section in FIG. 14(c), and is such that a stainless steel material is treated in hardening or quenching and, subsequently, a contact surface 141 with respect to the ultrasonic oscillator 110 is polished smoothly. The contact surface and an upper surface 142 are connected to each other by thin wall portions 139 and 140. By doing so, since oscillation is reflected by the thin wall portions 139 and 140, oscillation energy is not leaked to the outside, and it is possible to improve efficiency of the ultrasonic motor.

Next, a linear guide moving portion 135 is integrally fixed to an upper surface of the body to be driven 134, and is urged downwardly by a linear guide fixing portion 136. The reference numeral 137 denotes a leaf spring for providing an urging force, while the reference numeral 138 denotes a spring retaining portion which is fixedly mounted on a base (not shown).

Next, operation of the ultrasonic motor will be described. Similar to the third embodiment, alternating voltage is applied to an A-phase and a B-phase of the ultrasonic oscillator 110, and a phase difference is brought to 90 degrees (or −90 degrees). Then, ultrasonic elliptic oscillation is excited on a sliding surface of the ultrasonic oscillator 110 so that the body to be driven 134 is moved in a right-hand direction (or a left-hand direction). Motor characteristics of the present embodiment are such that no-load speed is 200 mm/sec, and a motive thrust force is 3N. This performance is maintained also after 100,000 reciprocal movement operation.

A fifth embodiment of the invention will next be described.

Figure 15:
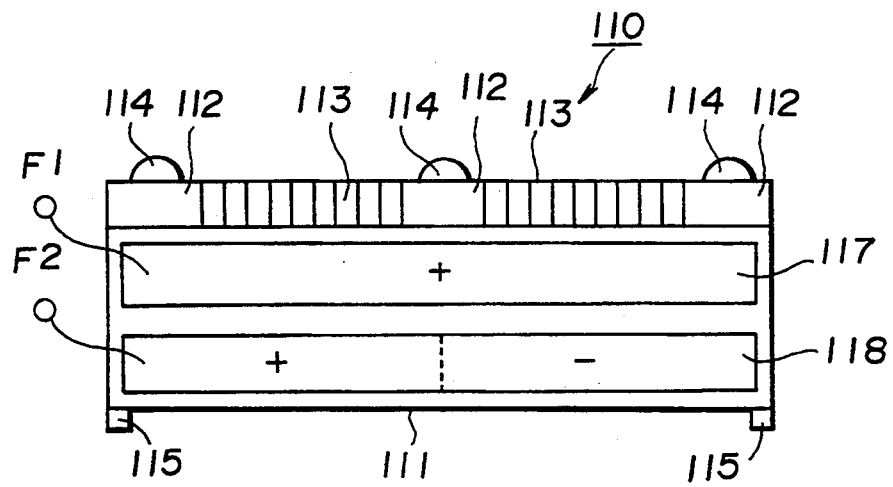
FIG. 15 is a front elevational view showing an ultrasonic oscillator which is applied to an ultrasonic motor according to a fifth embodiment of the invention.

FIG. 15 is a front elevational view showing an ultrasonic oscillator which is applied to an ultrasonic motor according to the fifth embodiment of the invention.

As shown in FIG. 15, in an ultrasonic oscillator 110, a pair of piezoelectric elements 117 and 118 for detection of oscillation are respectively bonded to or adhered to side surfaces of a basic elastic body 111. The detection piezoelectric elements 117 and 118 are made of PZT ceramics, and have a thickness of 0.2 mm in which silver electrode treatment is applied to both surfaces. The detection piezoelectric element 117 is polarized in the same orientation over the entire surface, and the detection piezoelectric element 118 is polarized in the opposite direction with a central portion serving as a boundary. Lead wires F1 and F2 are connected respectively to the detection piezoelectric elements 117 and 118. Common ground wires forming a pair with respect to the lead wires are connected to the basic elastic body 111.

Next, operation of the embodiment will be described. Similarly to the third embodiment, when alternating voltage is applied to a pair of laminated piezoelectric elements 113 to excite primary longitudinal oscillation, there is produced a sine-wave signal proportional to the oscillation amplitude, from the F1 terminal, and there cannot be produced from the F2 terminal. Next, when the alternating voltage is applied to the laminated piezoelectric elements 113 to excite secondary bending oscillation, no signal is produced from the F1 terminal, but there can be produced a sine-wave signal proportional to the oscillation amplitude, from the F2 terminal.

Next, when the primary longitudinal oscillation and the secondary bending oscillation are simultaneously excited to excite ultrasonic elliptic oscillation, there can be produced a sine-wave signal from both the F1 and F2 terminals. The signal from the F1 terminal in this case is proportional to the primary longitudinal oscillation, while the signal from the F2 terminal is proportional to the secondary bending oscillation.

Figure 16:
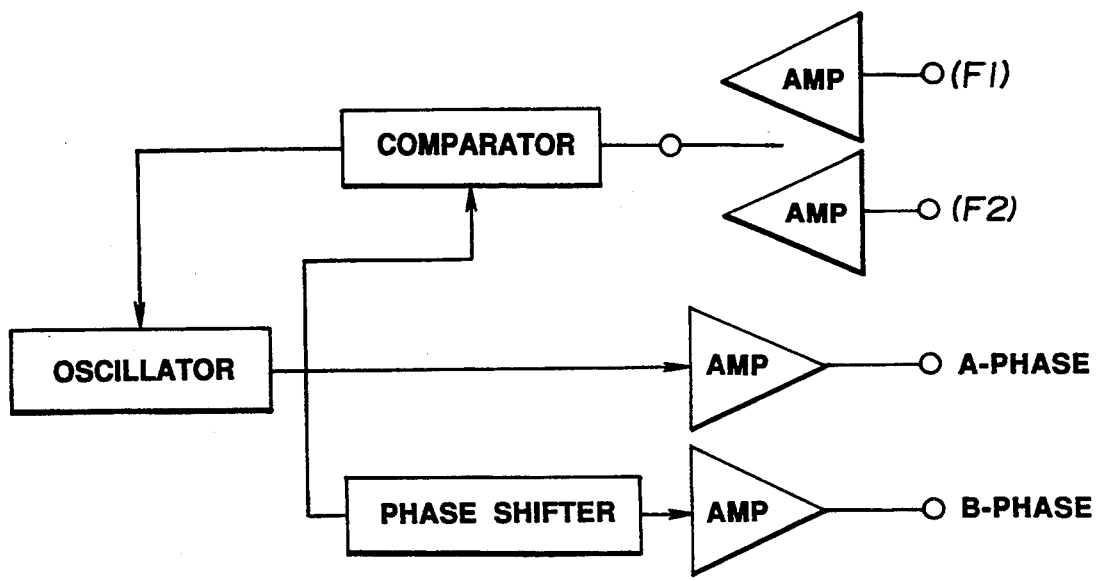
FIG. 16 is a drive circuit view showing the ultrasonic oscillator illustrated in FIG. 15.

When the ultrasonic oscillator is driven for a long period of time, temperature of the oscillator rises, and resonant frequency is changed. Accordingly, the frequency must be tracked in order to maintain an oscillatory condition of the oscillator constant. In the present embodiment, tracking is performed by a circuit arrangement as shown in FIG. 16. That is, an output of alternating voltage from an oscillator is amplified and is applied to the A-phase, and is passed through a phaser and is amplified and applied also to the B-phase. A signal at the F1 terminal (or the F2 terminal) is amplified. The signal is compared with a signal from the oscillator as monitor voltage. Excited frequency should be regulated such that a phase difference therebetween is constant, or the excited frequency should be regulated such that the monitor voltage is always maximized.

Figure 17:
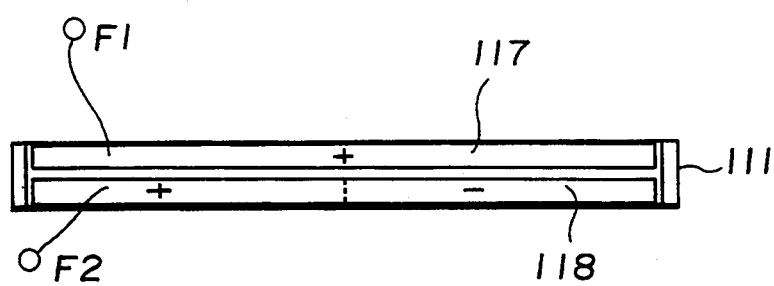
FIG. 17 is a bottom view showing a modification of the ultrasonic oscillator.
Figure 18:
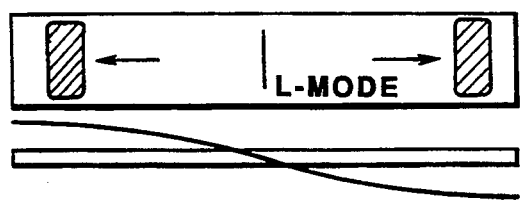
FIG. 18 is a view for explanation of a longitudinal oscillation mode in a conventional ultrasonic motor.
Figure 19:
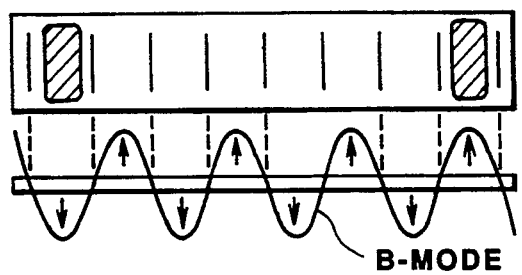
FIG. 19 is a view for explanation of a bending oscillation mode in the conventional ultrasonic motor.
Figure 20:
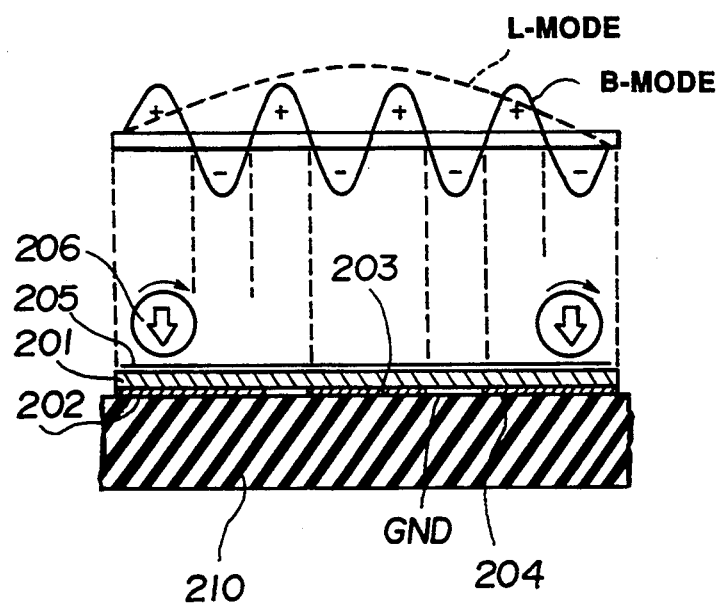
FIG. 20 is a side elevational, cross-sectional view showing the conventional ultrasonic motor and an oscillation mode thereof.

In connection with the above, mounting positions of the respective detection piezoelectric elements may be arranged as shown in FIG. 17. That is, in FIG. 17, the detection piezoelectric elements 117 and 118 are adhered to a bottom surface of the basic elastic body 111. Further, the F2 signal may be utilized as the monitor signal. If the sum of the F1 signal and the F2 signal is utilized, frequency tracking is possible.

As described above, according to the present embodiment, it is possible to maintain the oscillation condition constant regardless of temperature rise of the oscillator so that the motor characteristic can be stabilized.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. An ultrasonic motor comprising:
   an elastic body having at least one driving element;
   at least two laminated piezoelectric bodies each arranged in a recess provided in said elastic body and clamped by portions of said elastic body at ends of its associated recess said elastic body and said laminated piezoelectric bodies forming an ultrasonic oscillator;
   said driving element being displaced from a central point of said elastic body;
   voltage applying means for applying to said two laminated piezoelectric bodies first phase and second phase alternating voltages having phases which differ from one another by 90 degrees causing the elastic body to simultaneously experience two degenerate oscillation modes to generate elliptical oscillation in a portion of said driving element; and
   a driven element engaging said driving element and being driven thereby.

2. An ultrasonic motor according to claim 1, wherein said elastic body has a substantially rectangular parallelepiped shape except for the clamped portion, wherein the two degenerate oscillation modes are respectively longitudinal oscillation and bending oscillation modes, wherein each of said laminated piezoelectric bodies has a center thereof which is arranged at a position where strain of the bending oscillation mode is substantially maximized and at a position where the laminated piezoelectric body has an end thereof which does not exceed a position of a node of the bending oscillation mode, and wherein the two laminated piezoelectric bodies are arranged at a position where strain of the longitudinal oscillation mode is generated uniformly in the same direction and at the same phase.

3. An ultrasonic motor according to claim 1 wherein the portion of said elastic body clamping said piezoelectric bodies is comprised of a pair of separate grooves provided along one surface of said elastic body and each having a pair of ends, each piezoelectric body being placed in an associated one of said grooves and being pre-loaded therein by the ends of said groove.

4. An ultrasonic motor according to claim 1 wherein said laminated piezoelectric bodies are of similar size.

5. An ultrasonic motor according to claim 1 wherein each of said laminated piezoelectric bodies is comprised of a plurality of piezoelectric layers laminated to one another.

6. An ultrasonic motor according to claim 1 wherein said driving portion is removably mounted to said elastic body.

7. An ultrasonic motor according to claim 1 wherein said driving portion is comprised of a removably mounted frictional member.

8. An ultrasonic motor according to claim 1 wherein a portion of the elastic body extending between said driving element and a recess for a laminated piezoelectric body closer to said driving portion is provided with a plurality of lateral grooves in at least one major surface of said elastic body for reducing Young's modulus of said elastic body.

9. An ultrasonic motor according to claim 1 wherein a portion of the elastic body extending between said driving element and a recess for a laminated piezoelectric body closer to said driving portion is provided with a plurality of lateral grooves in both major surfaces of said elastic body for reducing Young's modulus of said elastic body.

10. An ultrasonic motor according to claim 1 wherein said driving element comprises means for mounting any one of a plurality of driving members any one of which may be releasably mounted to said elastic body, each of said driving members having one of a shape and a mass which differs from the other driving members whereby the driving member mounted to said elastic body is selected according to an application most suitable to a shape and a mass of the selected driving member.

11. An ultrasonic motor according to claim 1 wherein said movable member and said ultrasonic oscillator are fixed to a stationary member whereby relative movement between said movable member and said ultrasonic oscillator results in movement of said ultrasonic motor relative to said stationary member.

12. An ultrasonic motor according to claim 1 wherein said ultrasonic oscillator is fixed to a stationary member whereby relative movement between said movable member and said ultrasonic oscillator results in movement of said movable member relative to said stationary member.

13. An ultrasonic motor according to claim 1 further comprising first and second piezoelectric detection bodies mounted upon said elastic body for respectively detecting only longitudinal vibration and only bending vibration; and
    means for comparing detected signals from said detecting bodies with at least one of the signals employed to drive one of said first and second piezoelectric bodies and means for adjusting an AC voltage of said applying means to compensate for temperature changes during operation thereof.

14. An ultrasonic motor according to claim 1 wherein said laminated piezoelectric bodies comprise a plurality of thin piezoelectric elements stacked one upon another to form an elongated stack of a plurality of said piezoelectric elements having a top and a bottom;
    the ends of each recess respectively engaging a top and a bottom of said stack.

15. An ultrasonic motor according to claim 1 wherein said driving element projects from a surface of said elastic body.

16. An ultrasonic motor according to claim 1 wherein the alternating voltages are of the order of 10 volts peak-to-peak.

17. An ultrasonic motor comprising:
an elastic body having at least one driving element;
four laminated piezoelectric bodies each arranged in a recess in said elastic body and being clamped by portions of said elastic body at ends of its associated recess;

said elastic body and said piezoelectric bodies forming an ultrasonic oscillator;

said elastic body having first and second major faces each containing recesses for receiving two of said piezoelectric bodies, the recesses on each major surface being on opposite sides of a central portion of said elastic body;

voltage applying means for applying first phase and second phase alternating voltages, having phases different from one another by 90 degrees, to said four laminated piezoelectric bodies to cause said ultrasonic oscillator to simultaneously experience two degenerate oscillation modes to generate elliptical oscillation at a portion of said driving element, a first and a second one of said piezoelectric bodies being arranged side by side in the first major face, a third and a fourth one of said piezoelectric bodied being arranged in the second major face, said first and third bodies being opposite one another, said second and fourth bodies being opposite one another, said four laminated piezoelectric bodies being divided into first and second groups each respectively including said first and fourth and said second and third piezoelectric bodies, said first and second groups being respectively driven by said first phase and second phase alternating voltages; and a driven element engaging said driving element and being driven thereby.

18. An ultrasonic motor according to claim 1 or 17, wherein said elastic body has a substantially rectangular parallelepiped shape,
    said two degenerate oscillation modes are respectively longitudinal oscillation and bending oscillation, and
    at least one of the laminated piezoelectric bodies experiencing bending oscillation being clamped by a portion of said elastic body.

19. An ultrasonic motor comprising:
an elastic body having at least one driving element;
first, second and third laminated piezoelectric bodies arranged in first, second and third recesses in said elastic body and being respectively clamped by portions of said elastic body at ends of said first, second and third recesses;

said elastic body and said first, second and third laminated piezoelectric bodies forming an ultrasonic oscillator;

said recesses being arranged at spaced intervals along said elastic body;

said first and second recesses being on opposite sides of a central portion of said elastic body and on opposite sides of said third recess;

said drive element being displaced from said central portion;

voltage applying means for applying first and second alternating voltages to said first and second piezoelectric bodies whereby said first and second alternating voltages different phase from one another by 180 degrees and simultaneously therewith applying a third alternating voltage to said third piezoelectric body whereby said third alternating voltage differs in phase from said first and second alternating voltages by 90 degrees, to generate two degenerate oscillation oscillated modes in said ultrasonic oscillator to cause elliptical oscillation of a portion of said driving element; and a driven element engaging said driving element and being driven thereby.

20. An ultrasonic motor according to claim 19 wherein said elastic body has a substantially rectangular parallelepiped shape;

said two degenerate oscillation modes respectively being a longitudinal oscillation and a bending oscillation of said elastic body; and said first and second laminated piezoelectric bodies being arranged in a bending oscillation portion of said elastic body and said third laminated piezoelectric body being clamped by a joint portion experiencing longitudinal oscillation.

21. An ultrasonic motor according to claim 1, 18 or 20 further comprising a first oscillation detecting piezoelectric element provided on said elastic body for detecting only longitudinal oscillation, and a second oscillation detecting piezoelectric element provided on said elastic body for detecting only bending oscillation.

22. An ultrasonic motor according to claim 21 wherein said piezoelectric oscillation detecting elements have a thickness of the order of 0.1 mm.

23. An ultrasonic motor according to claim 21, wherein said first oscillation detecting element is arranged such that piezoelectric elements having polarization in the same orientation are bonded to each other and are electrically connected in series to each other at two locations of said elastic body, that is, at two locations where oscillation strain of the first oscillation mode is brought to the same level and to the same phase and where the oscillation strain of the second oscillation mode is brought to the same level and a reversed phase, and wherein said second oscillation detecting element is arranged such that piezoelectric elements having polarization in the reversed orientation are bonded to each other and are electrically connected in series to each other at two locations of said elastic body different from the two locations of the fist oscillation detecting element, that is, at two locations where oscillation strain of the first oscillation mode is brought to the same level and to the same phase and where the oscillation strain of the second oscillation mode is brought to the same level and to a reversed phase.

24. An ultrasonic motor according to claim 1 or 17 or 19, wherein said applying means provides a DC voltage superimposed on said alternating voltage in an elongated direction of the laminated piezoelectric body at least during movement of the ultrasonic motor.

25. A method for operating an ultrasonic motor comprised of an elongated elastic body, a pair of laminated piezoelectric bodies arranged within recesses provided at spaced intervals along one surface of said elastic body and a driving portion arranged along said elastic body, said method comprising the steps of:

applying electrical energy in the form of alternating voltage signals to said piezoelectric bodies of substantially equal frequency and amplitude; and providing a phase difference of approximately 90 degrees between said alternating voltages chosen to cause said driving portion to experience elliptical oscillation;

applying a DC voltage to each piezoelectric body to maintain said piezoelectric bodies under compression;

placing a movable member against said driving portion; and urging said movable member toward engagement with said driving portion whereby the electrical energy applied to said laminated piezoelectric bodies causes movement of said movable body relative to said ultrasonic motor.

26. An ultrasonic motor comprising:

an elastic body having a substantially rectangular parallelepiped shape;

first and second laminated piezoelectric bodies;

first, second and third retaining bodies fixedly secured at spaced intervals to one surface of said elastic body;

said first laminated piezoelectric body being arranged in a gap space between said first and second retaining bodies;

said second laminated piezoelectric body being clamped in a gap space between said second and third retaining bodies;

said first and second piezoelectric bodies being on opposite sides of a central portion of said elastic body;

said elastic body having at least one driving portion arranged on a surface opposite and parallel to said one surface;

means for applying alternating voltage signals which differ in phase by 90° to said piezoelectric bodies to cause said driving portion to experience elliptical oscillation; and means for urging a movable member against said driving portion whereby said movable member experiences movement relative to said elastic body due to said elliptical oscillations.

* * * * *